United States Patent
Cheng et al.

(10) Patent No.: US 11,536,852 B2
(45) Date of Patent: Dec. 27, 2022

(54) METHOD AND APPARATUS FOR DIAGNOSING DEVICE FAILURE

(71) Applicant: u-blox AG, Thalwil (CH)

(72) Inventors: Zhenlan Cheng, Eglisau (CH); Toni Huovinen, Pirkkala (FI); Eero Aho, Tampere (FI); Thomas Brauner, Ebertswil (CH); Barbara Baggini, Aeugst am Albis (CH)

(73) Assignee: U-BLOX AG, Thalwil (CH)

( * ) Notice: Subject to any disclaimer, the term of this patent is extended or adjusted under 35 U.S.C. 154(b) by 100 days.

(21) Appl. No.: 17/130,476

(22) Filed: Dec. 22, 2020

(65) Prior Publication Data
US 2022/0196846 A1 Jun. 23, 2022

(51) Int. Cl.
*G01S 19/23* (2010.01)

(52) U.S. Cl.
CPC .................... *G01S 19/23* (2013.01)

(58) Field of Classification Search
CPC ........................................ G01S 19/23
USPC .................................... 342/357.62
See application file for complete search history.

(56) References Cited

U.S. PATENT DOCUMENTS

2006/0005087 A1  1/2006  Ristau et al.
2015/0372773 A1* 12/2015  Hammes .................. H03L 7/08
                                                               375/224

FOREIGN PATENT DOCUMENTS

| CN | 201273939 Y | * | 7/2009 | |
|---|---|---|---|---|
| CN | 102749536 B | * | 5/2014 | |
| CN | 204789801 U | * | 11/2015 | |
| DE | 60128017 T2 | * | 12/2007 | ............ H01Q 19/17 |

OTHER PUBLICATIONS

M. Padma, Laxmanshanigarapu, "Design and Test of Concurrent BIST Architecture", IJCSMC, vol. 4, Issue. 7, pp. 21-26, Jul. 2015.

* cited by examiner

*Primary Examiner* — Harry K Liu
(74) *Attorney, Agent, or Firm* — Finnegan, Henderson, Farabow, Garrett & Dunner LLP

(57) ABSTRACT

A GNSS receiver having test signal based failure detection, comprises: a signal generator configured to generate a test signal, the test signal having characteristics of a GNSS signal; one of more amplifiers configured to amplify the test signal; a signal chain configured to receive the amplified test signal at an input node of the signal chain and process the received test signal; and a signal processor configured to: monitor the test signal by: obtaining one or more output signals of the device at one or more output node; recovering the test signal from the one or more output signals, and determining whether one or more errors occurred based on parameters of the recovered test signal based on parameters of the recovered test signal; identify a device failure based on the determined one or more errors; and generate notifications relating to the device failure.

18 Claims, 3 Drawing Sheets

METHOD AND APPARATUS FOR DIAGNOSING DEVICE FAILURE

TECHNICAL FIELD

Apparatus and method consistent with the present disclosure relate generally to diagnosing failure of a receiver device.

BACKGROUND

Reliable operation of electronic devices is an important aspect in the field of wireless communication, particularly when such electronic devices serve important functions, e.g., safety functions. For example, it may be important for a global navigation satellite system (GNSS) receiver to function with high reliability when such a receiver is relied upon for applications such as an autonomous vehicle, robotic lawn mower, where safety is a consideration or an autonomous drone. In those instances, it may be necessary to provide means to test or check various hardware and/or software modules of the electronic devices to diagnose potential failures or faults during operation. Examples of products for which testing for potential failure is important may include electronics complying with relevant safety standards, such as IEC 61508 and/or ISO 26262 functional safety standards.

Generally, testing an electronic device for failures or faults may be carried out in two principle modes. According to the first mode, known as foreground testing, the electronic device is taken off-line for a short period in order to carry out the testing. However, the electronic device would typically be unavailable to carry out its normal operating functions in this mode of testing, which may be problematic for applications that require high levels or near constant levels of availability. Alternatively, in the second mode, the electronic device may be tested in the background during normal operation with the addition of dedicated diagnostic hardware. This mode of testing has the advantage that normal operation of the device is not interrupted while it is tested. However, since the added hardware is not used in the normal operation, the test results may not reflect the actual configuration of the electronic device during use, thus reducing diagnostic coverage.

Therefore, it is more desirable to test an electronic device during its normal operation, with minimum hardware addition dedicated to diagnostic testing. Prior attempts generally encountered difficulty with accommodating both the normal operational needs and the testing needs using the same hardware configuration. For example, in a GNSS receiver, the receiver hardware may be needed to process both a live GNSS signal and a test signal, which may be difficult to accomplish while maintaining the integrity of both the normal operation and the diagnostic operation.

SUMMARY

In accordance with the present disclosure, there is provided a method for diagnosing a failure of a device, comprising steps of: generating a test signal, the test signal including characteristics of a GNSS signal; amplifying the test signal; injecting, after amplifying, the test signal into the device at an input node; processing, by a signal chain of the device, the test signal; monitoring the test signal by: obtaining one or more output signals of the device at one or more output nodes; recovering the test signal from the one or more output signals; and determining whether one or more errors in the test signal are present based on parameters of the recovered test signal; identifying a device failure based on the determined one or more errors; and generating an indication relating to the device failure.

In accordance with the present disclosure, there is also provided a GNSS receiver having test signal based failure detection, comprising: a signal generator configured to generate a test signal, the test signal having characteristics of a GNSS signal; one of more amplifiers configured to amplify the test signal; a signal chain configured to receive the amplified test signal at an input node of the signal chain and process the received test signal; and a processor configured to: monitor the test signal by: obtaining one or more output signals of the device at one or more output nodes, recovering the test signal from the one or more output signals, and determining whether one or more errors occurred based on parameters of the recovered test signal based on parameters of the recovered test signal; identify a device failure based on the determined one or more errors; and generate notifications relating to the device failure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise specified. The implementations set forth in the following disclosure are consistent with aspects related to the invention as recited in the appended claims.

According to some embodiments of the present disclosure, there is provided a GNSS receiver having test signal based failure detection. The GNSS receiver may be an electronic device capable of receiving radio-frequency (RF) signals of various types, including GNSS signals. Examples of GNSS signals may include, but are not limited to, RF signals of Global Positioning System (GPS), Global Navigation Satellite System (GLONASS), BeiDou Navigation Satellite System (BDS), Galileo System, or signals of other such satellite based navigation systems. A person of ordinary skill in the art will appreciate that GNSS signals may be any electromagnetic signals suitable in power, frequency band, and other characteristic for use by a GNSS system.

Figure 1:
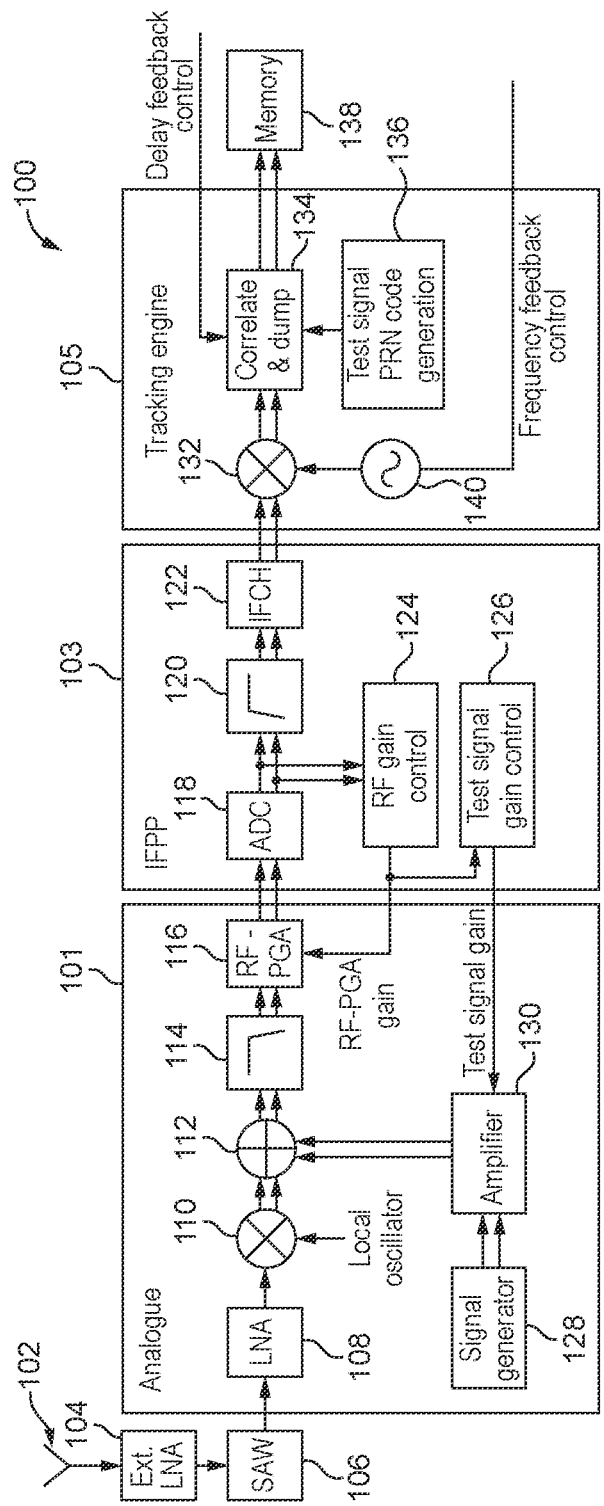
FIG. 1 is a schematic diagram illustrating an exemplary GNSS receiver device with integrated diagnostic testing, consistent with the present disclosure.

The GNSS receiver includes a signal chain. The signal chain refers to one or more hardware or software modules of the GNSS receiver that receive, convert, mix, or otherwise process the GNSS signal. By way of example, as depicted in FIG. 1, device 100 is an example of the GNSS receiver. The signal chain for exemplary device 100 includes an analog module 101, an intermediate frequency pre-processing (IFPP) module 103, and a tracking engine 105. In some embodiments, the signal chain of device 100 may optionally include an antenna 102, an external low noise amplifier (LNA) 104, and/or a surface acoustic wave (SAW) filter 106 coupled to the input of analog module 101. In some embodiments, the signal chain of device 100 may also optionally include a or memory 138 coupled to tracking engine 105. In some embodiments, memory 138 stores output data of tracking engine 105. In some embodiments, memory 138 may also store other data values 100. A person of ordinary skill will appreciate that the exemplary device 100 is merely illustrative, and that components may be added, removed, modified or rearranged to suit various design needs and goals without departing from the present disclosure.

In some embodiments, analog module 101 is a portion of device 100 including components that are considered "analog" and serves the function of receiving, amplifying and down-converting the GNSS signal from an RF carrier frequency to an intermediate frequency (IF). Analog module 101 includes an LNA 108, a mixer 110, a signal adder 112, a low-pass filter 114, and an RF programmable (or variable) gain amplifier (PGA) 116. A GNSS signal may be received by antenna 102, amplified by external LNA 104, and filtered by SAW filter 106 before being coupled to analog module 101. The GNSS signal received by antenna 102 is hereafter referred to as a "live" GNSS signal. The live GNSS signal is distinguished from a test signal that may be internally generated by device 100. Examples of the live GNSS signal may include CDMA or OFDM signals. The live GNSS signal is amplified by LNA 108 and then mixed with a local oscillator signal at mixer 110. The local oscillator signal may be generated by a local oscillator (not depicted in FIG. 1). The mixing operation down-converts the live GNSS signal from the RF carrier frequency to the intermediate frequency. In some embodiments, mixer 110 may be a quadrature (I/O) mixer, and the down-converted live GNSS signal includes an in-phase component (I) and a quadrature-phase component (Q). In FIG. 1, signals represented by double lines represent signals having I/O components.

At signal adder 112, a test signal is added to the live GNSS signal to create a mixed signal. The test signal may be amplified before it is injected into the signal chain via signal adder 112. The mixed signal is then filtered by low-pass filter 114 and amplified by RF PGA 116. In some embodiments, RF PGA 116 may be controlled by a command or signal from an RF gain control unit 124, which is discussed in detailed below. In some alternative embodiments, signal adder 112 may be located prior to mixer 110, allowing the test signal to be added to the live GNSS signal prior to down-conversion at mixer 110.

Analog module 101 further includes a test signal generator 128 and a test signal amplifier 130. Test signal generator 128 may be one or more electronic components that generate waveforms, patterns, functions, and/or other such electronic signals. Test signal generator 128 is configured to generate the test signal. In some embodiments, the test signal is an electrical signal designed to produce known results after being processed by components of device 100. For diagnostic purposes, the test signal may have one or more parameters having values that can be monitored or measured, and may be compared with some expected values. These parameters may include phase, timing, amplitude, or information contained therein e.g., pseudorandom noise (PRN) codes. In some embodiments, the test signal may be designed to mimic or share some characteristics of a typical GNSS signal, such as frequency, bandwidth, encoding, modulation, and/or other characteristics relevant for diagnostic purposes. However, in order for the test signal and the live GNSS signal to be distinguished from each other during operation, the test signal may be configured to be different from the live GNSS signal in one or more of a PRN code, bandwidth, amplitude, and/or center frequency. In some embodiments, the test signal may also include an in-phase component (I) and a quadrature-phase component (Q).

Test signal amplifier 130 is coupled to receive the test signal generated by test signal generator 128, and is configured to amplify the test signal. In some embodiments, test signal amplifier 130 may be a programmable/variable gain amplifier, controlled to amplify the test signal to a desired amplitude. In some embodiments, test signal amplifier 130 may be controlled to provide an amplitude of the test signal based on the amplitude of the live GNSS signal, such that the power spectral density of the test signal is 16 dB or lower than that of noise at the injection node. For example, the test signal may have an amplitude that is noticeably smaller than the amplitude of the live GNSS signal. In some embodiments, test signal amplifier 130 may be controlled by a command or signal from a test signal gain control unit 126, which will be discussed in more detail in sections below. By adjusting the amplitude of the test signal based on the amplitude of the live GNSS signal, device 100 may thus prevent the test signal from interfering with detection of the live GNSS signal when signal reception is weak. Conversely, it might be necessary to boost the amplitude of the test signal, e.g. when the signal strength of the received GNSS signal is high.

IFPP module 103 includes hardware/software modules for demodulating signals into readable data bits. In some embodiments, IFPP module 103 includes an analog-to-digital converter (ADC) 118, a high-pass filter 120, and an intermediate frequency channel (IFCH) 122. ADC 118 is coupled to receive the mixed signal from RF PGA 116 and converts the received mixed signal from an analog form to a digital form. High-pass filter 120 is coupled to the output of ADC 118 and filters the digitized mixed signal received by IFCH 112. IFCH 122 includes circuits or components configured to demodulate, decode, or otherwise process the mixed signal into data bits into different channels for further processing. For example, IFCH 122 may include components such as downconverters, bandpass filters, automatic gain control (AGC) or parts thereof, and/or circuitry for signal processing of the intermediate frequency channels known to a person of ordinary skill in the art.

IFPP module 103 further includes an RF gain control unit 124 and a test signal gain control unit 126. RF gain control unit 124 is coupled to receive the mixed signal from ADC 118 and output a command/signal to RF PGA 116 and to test signal gain control unit 126. In some embodiments, RF gain control unit 124 may be programmed to compare the amplitude of the received mixed signal to a predetermined amplitude value, and output a command/signal to increase or decrease the gain level of RF PGA 116 so that the amplitude of the received mixed signal matches the predetermined amplitude value. Test signal gain control unit 126 is configured to receive the command/signal from RF gain control unit 124 and determine a gain level for test signal amplifier 130. For example, test signal gain control unit 126 may be programmed to calculate, based on information of the amplitude of the mixed signal from RF gain control unit 124, any increase or decrease to the gain level of test signal amplifier 130. In some embodiments, RF gain control unit 124 and/or test signal gain control unit 126 may include programmable circuitry such as microprocessors, microcontrollers, logic gate arrays, FPGA, and/or other integrated circuities that are programmable. In some embodiments, RF gain control unit 124 and/or test signal gain control unit 126 may be implemented as modules or software components of processors, such as digital signal processors or central processing units.

Tracking engine 105 includes hardware/software modules that maintain a tracking loop with the received live GNSS signal. The tracking loop refers to a feedback loop utilized by device 100 to estimate parameters of the live GNSS signal in order to obtain an accurate value of a distance between device 100 and a satellite that transmits the live GNSS signal. Examples of the parameters of the tracking loop include, but are not limited to, carrier phase shift, doppler shift, and/or code delay. Tracking engine 105 includes a mixer 132, a correlate-and-dump unit 134, a test signal PRN code generator 136, and an oscillator 140.

In some embodiments, mixer 132 mixes the mixed signal received from IFCH 122 with an oscillator signal generated by oscillator 140. In some embodiments, oscillator 140 may contain a carrier signal generator driven by a numerically-controlled oscillator (NCO). Oscillator 140 generates the oscillator signal having phase and frequency that the oscillator signal is configured to correct for carrier phase shift of the live GNSS signal contained in the mixed signal at mixer 132. Oscillator 140 may generate the oscillator signal based on a feedback control signal. For example, the carrier signal generator of oscillator 140 may be controlled by a feedback frequency control signal, and the NCO of oscillator 140 may controlled by a feedback phase control signal. The feedback frequency and phase control signals may be generated by one or more diagnostic modules, whose details are described below with reference to FIG. 2. In some embodiments, test signal PRN code generator 136 generates the pseudo-random number (PRN) of the test signal.

Correlate-and-dump unit 134 performs correlation of the mixed signal with a local replica signal and the test signal itself. The local replica signal is a signal that is identical to the signal transmitted by the satellite (a version of the live GNSS signal without distortions caused by propagation or signal processing). In some embodiments, correlate-and-dump unit 134 may be a multi-correlator (not depicted), and performs correlation of the mixed signal and the local replica signal at times $t_{early}$, $t_{prompt}$, and $t_{late}$. $t_{prompt}$ refers to a time at which the local replica signal and the live GNSS signal are aligned, $t_{early}$ refers to a time before $t_{prompt}$, and $t_{late}$ refers to a time after $t_{prompt}$. Correlate-and-dump unit 134 also performs correlation with the mixed signal with the test signal at times $t_{early}$, $t_{prompt}$, and $t_{late}$. Outputs of correlate-and-dump unit 134 may be stored in memory 138 for later processing.

Figure 2:
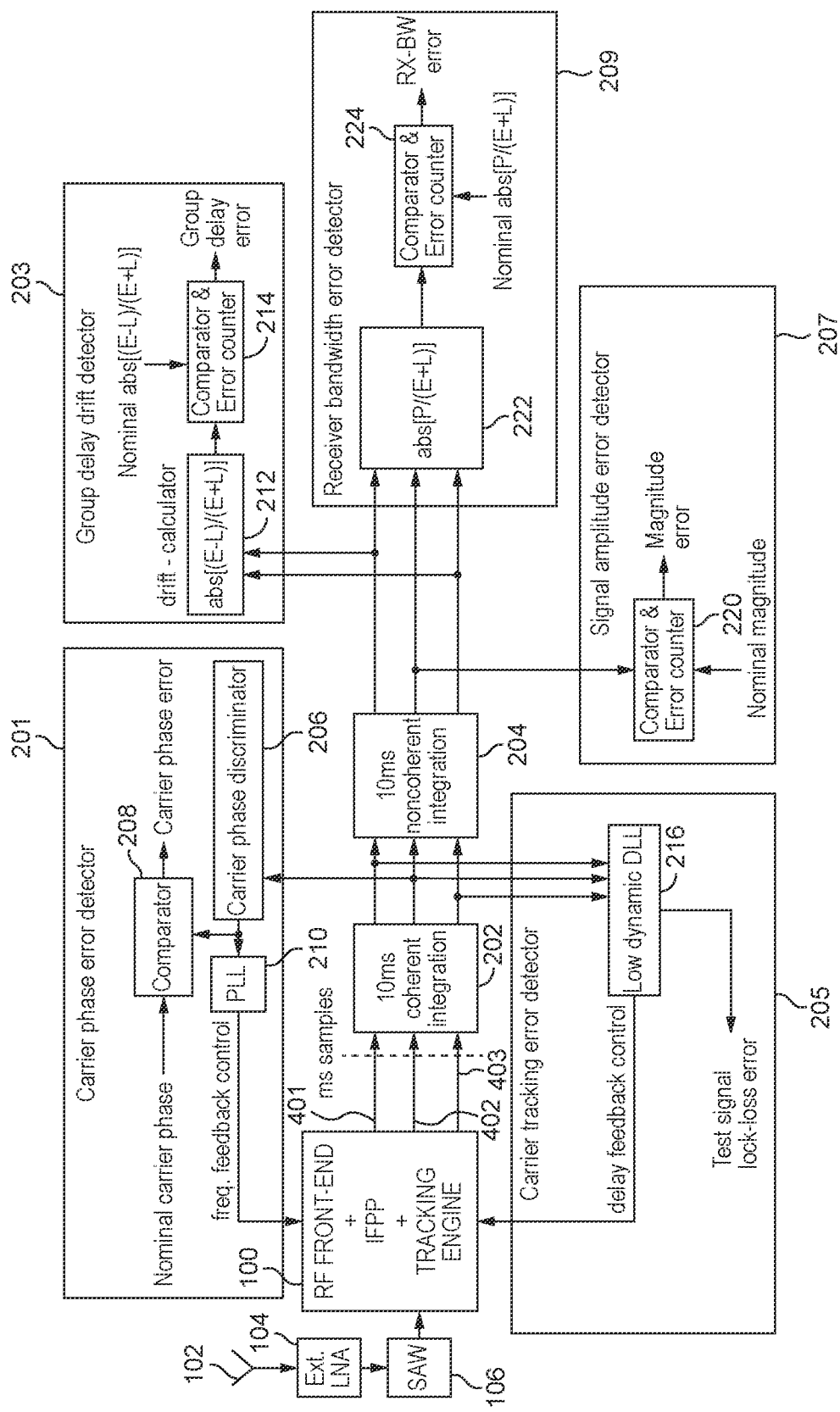
FIG. 2 is a schematic diagram illustrating diagnostic modules of an exemplary GNSS receiver device, consistent with the present disclosure.

FIG. 2 is a schematic diagram illustrating diagnostic modules of an exemplary GNSS receiver device, consistent with the present disclosure. Correlate-and-dump unit 134 produces an early correlation signal (early signal 401), a prompt correlation signal (prompt signal 402), and a late correlation signal (late signal 403), corresponding to $t_{early}$, $t_{prompt}$, and $t_{late}$, respectively. In some embodiments, early signal 401, prompt signal 402, and late signal 403 may be produced on a millisecond scale, such as 1 sample per millisecond. Early signal 401, prompt signal 402, and late signal 403 contain both correlated signals of 1) the live GNSS signal with the local replica signal, and 2) the test signal with itself, at the respective time delay $t_{early}$, $t_{prompt}$, and $t_{late}$.

Since the test signal does not experience any change, deformation and/or delay due to propagation, any deviations of the test signal from itself would therefore be attributed to signal processing by device 100. These deviations may be obtained by prior testing. For example, prior testing of device 100 may yield nominal values of auto-correlation of the test signal, and these nominal values may be stored in a memory device (e.g., memory 138). For example, the nominal values of the test signal may include nominal values of early signal 401, prompt signal 402, and late signal 403 for test signal at delays $t_{early}$, $t_{prompt}$, and $t_{late}$. In some embodiments, nominal values of carrier phase of the test signal may also be stored in memory 138 of device 100.

According to some embodiments, the diagnostic modules include a carrier phase error detector 201, a group delay drift detector 203, a carrier tracking error detector 205, a signal amplitude error detector 207, and a receiver bandwidth (BW) error detector 209. In some embodiments, one or more of these diagnostic modules may be software modules (e.g. code, programs, functions, logics) executed in microprocessors, microcontrollers, logic gate arrays, FPGA, and/or other programmable integrated circuitry.

In some embodiments, outputs of correlate-and-dump unit 134 are coupled to a first integrator 202 and a second integrator 204. Alternatively, outputs of correlate-and-dump unit 134 may be stored in memory 138, which in turn provides the stored outputs to first integrator 202 and second integrator 204. First Integrator 202 and second integrator 204 are integrating units that are known as "integrate-and-dump" units configured to accumulate and average inputs over a time period, then output the accumulated values and reset the time period. In some embodiments, first integrator 202 may be a coherent integrator with a period of 10 ms, and second integrator 204 may be a noncoherent integrator with a period of 100 ms. First Integrator 202 integrates early signal 401, prompt signal 402, and late signal 403 over a period of 10 ms, and second integrator 204 integrates outputs of first integrator 202 over a period of 100 ms. In some embodiments, first Integrator 202 and second integrator 204 may be implemented as software modules executed by a processing unit. In other embodiments, first and second integrators may be implemented in hardware as electronic circuits.

Carrier phase error detector 201 determines information regarding the carrier phase of the live GNSS signal, and provides correction values in order to keep the local replica signal as "matched" as possible with the live GNSS signal in the tracking loop. Carrier phase error detector 201 also determines whether the carrier phase of the test signal matches the nominal carrier phase value. Carrier phase error detector 201 includes a carrier phase discriminator 206, a comparator 208, and a phase loop lock (PLL) 210. Carrier phase discriminator 206 is coupled to receive the 10 ms integration of prompt signal 402 and provides as outputs, the carrier phase of prompt signal 402, for both the live GNSS signal and the test signal. PLL 210 uses the carrier phase of the live GNSS signal produced by carrier phase discriminator 206 to calculate feedback frequency and phase control signals to control oscillator 140 coupled to mixer 132 of FIG. 1. Comparator 208 uses the carrier phase of the test signal produced by carrier phase discriminator 206 to compare against the nominal carrier phase. A shift in the carrier phase of the test signal from the nominal carrier phase may produce a carrier phase error, which may indicate a device failure if the carrier phase error exceeds a threshold value.

Group delay drift detector 203 determines if there is a shift in the group delay of the test signal caused by device 100. Group delay refers to a delay of an overall envelope of a signal, and a shift in group delay may occur due to a non-linear frequency response of different components to the spectrum of frequencies contained in the signal. Group delay module includes a drift calculator 212 and a comparator and error counter 214. Drift calculator 212 is coupled to receive the 100 ms integrated values of the early signal 401 and late signal 403 from second integrator 204, and calculates a drift value given by equation 1:

$$\left|\frac{(E-L)}{(E+L)}\right| \quad (1)$$

In equation (1), E represents the 100 ms integrated value of the test signal components of early signal 401, and L represents the 100 ms integrated value test signal components of late signal 403. The resulting drift value of drift calculator 212 is compared to a nominal drift value by comparator and error counter 214. Since the test signal is artificially generated within device 100, its nominal drift value can be calculated from the nominal values stored in memory 138 of device 100. In some embodiments, comparator and error counter 214 may accumulate the differences between the calculated drift value and the nominal drift value over a time period (e.g. multiple of 100 ms) to produce group delay errors. In some embodiments, group delay module comparator and error counter 214 indicates a device failure if the group delay error exceeds a threshold value. The threshold value may be predetermined and stored in memory 138 of device 100.

Carrier tracking error detector 205 determines information regarding the code delay of the live GNSS signal, and provides corrections to correlate-and-dump unit 134 to keep the local replica signal in a tracking loop with the live GNSS signal. Carrier tracking error detector 205 includes a low-dynamic delay-locked loop (DLL) 216 coupled to receive 10 ms integrated values of early signal 401, prompt signal 402, and late signal 403, and determines code delay information of the live GNSS signal based on these received values. DLL 216 uses the code delay information to provide feedback control to correlate-and-dump unit 134 to maintain the tracking loop with the live GNSS signal. DLL 216 also determines, based on the integrated values of early signal 401, prompt signal 402, and late signal 403, a lock status of a test signal tracking loop. For example, since the test signal is generated within device 100, it should not have any delay. Thus, under normal operation conditions, the tracking loop of the test signal should always be locked (i.e., always tracked). If the lock status is lost for a threshold amount of time as determined by timer 218, carrier tracking error detector 205 may indicate an error in the test signal generator, or some other unspecific error with components of device 100.

Signal amplitude error detector 207 determines whether a magnitude of the auto-correlated test signal is within a designed range. Signal amplitude error detector includes a comparator and error counter 220 coupled to receive test signal component of the 100 ms integrated prompt signal 402. Comparator and error counter 220 compares the magnitude of the test signal component of prompt signal 402 with a nominal magnitude, and outputs a magnitude error based on the difference. If the magnitude error exceeds a threshold value, signal amplitude error detector indicates a possible device failure in one or more of the amplifiers (e.g., RF PGA 116), or some other failure in the analog module 101.

Receiver bandwidth (BW) error detector 209 determines whether a bandwidth of the test signal is within a designed range. In some embodiments, receiver BW error detector 209 includes a ratio calculator 222 coupled to receive the test signal components of the 100 ms integrated values of early signal 401, prompt signal 402, and late signal 403. Ratio calculator 222 outputs a ratio value of prompt signal 402 to the sum of early signal 401 and late signal 403 given by equation (2):

$$\left|\frac{P}{E+L}\right| \quad (2)$$

In equation (2), E represents the test signal components of the 100 ms integrated value of early signal 401, L represents the test signal components of the 100 ms integrated value of late signal 403, and P represents the test signal components of the 100 ms integrated value of prompt signal 402. Comparator and error counter 224 is coupled to receive the ratio value calculated by ratio calculator 222, and compares the ratio value to a nominal ratio value derived by the nominal values of E, L, and P. The differences between the nominal ratio value and the calculated ratio value may be accumulated and averaged by comparator and error counter 224, and may indicate a device failure when the accumulated differences exceeds a threshold value.

In some embodiments, false alarms refer to conditions when one or more of diagnostic modules 201-209 indicate errors or aberrations even when there is no hardware failure. False alarms may occur, for example, under jamming or adverse operating conditions that cause a large fluctuation in the live GNSS signal, which affects auto-correlation results of the test signal at correlate-and-dump unit 134. In some embodiments, a frequency of false alarm, (i.e., false alarm rate) may be minimized in order to increase maximize availability of device 100 for normal operation. For example, threshold values described above with respect to diagnostic modules 201-209 may be selected based on trade-offs between false alarm rate and sensitivity under the fault tolerant time interval (FTTI) requirement. For example, thresholds values may be determined based on theoretical simulations or actual testing of the live GNSS signal and device 100 for different scenarios and operating conditions (e.g. driving a car in landscape, city center, tunnels, jamming etc.).

Figure 3:
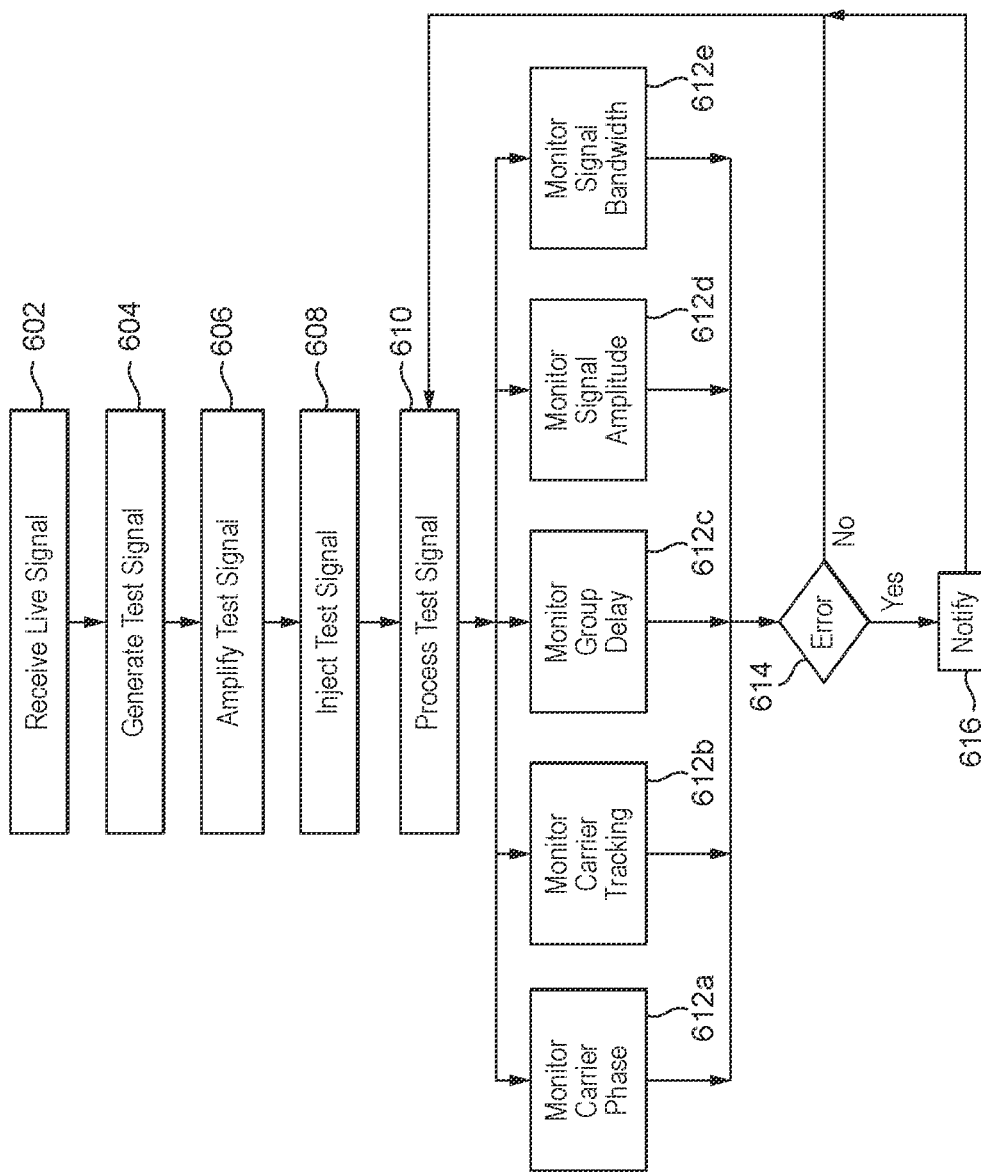
FIG. 3 illustrates a flow chart of an exemplary diagnostic testing operation of a GNSS receiver device, consistent with the present disclosure.

FIG. 3 depicts a flow chart of a process 600 for diagnostic testing operation of a GNSS receiver device such as device 100, consistent with the disclosed embodiments.

In step 602, the GNSS device receives a live GNSS signal. Referring back to FIG. 1, device 100 receives the live GNSS signal via antenna 102. The live GNSS signal is amplified by LNA 104 and filtered by SAW 106 before being coupled to the input of analog module 101. In some embodiments, one or more of antenna 102, LNA 104b and/or SAW 106 may be optionally detachable or separate external components of device 100. In some embodiments, step 602 may be optional. For example, even when no live GNSS signal is received, process 600 may still be performed in device 100 to monitor for failures in components of device 100. For example, without receiving a live GNSS signal, device 100 may still process the test signal as described above.

In step 604, a test signal is generated in the GNSS device, such as device 100. For example, referring back to FIG. 1, test signal generator 128 may generate the test signal. In some embodiments, step 604 may occur concurrently with step 602. The test signal generated may be one that mimics characteristics of a range of properties that are present in a live GNSS signal, so that the various components of device 100 may be monitored by monitoring the test signals at the output of device 100. For example, the test signal may be a CDMA signal or an OFDM signal, depending on which signal type of live GNSS signal device 100 is designed to receive. In some embodiments, the test signal may be modulated by a rectangular pulse signal or a sinusoidal signal. In some embodiments, a PRN-code property of the test signal may be controlled by a hardware or software module, such as test signal PRN code generator 136. To provide a wide range of monitoring, the test signal may be a wide band signal or a single band signal. A wide band as used herein refers a range of frequencies that may cover multiple single bands. A single band as used herein refers to a range of frequencies that are narrower in bandwidth relative to the wide band. For example, a live GNSS signal may occupy one single signal band, while a different live GNSS signal may occupy different single signal bands. An exemplary wide band test signal may therefore be designed to cover all single signal bands of live GNSS signals that device 100 is designed to receive. In some alternative embodiments, the test signal may include a plurality of single band signals, each of the single band test signals covering a single band of a live GNSS signal. In some embodiments, the live GNSS signal and the test signal differ in at least one of a PRN code, bandwidth, amplitude, or center frequency.

In step 606, one or more amplifiers amplifies the test signal. Referring back to FIG. 1, test signal amplifier 130 amplifies the test signal generated by test signal generator 128. Test signal amplifier 130 may be a programmable/variable gain amplifier whose gain value is controlled by a hardware or a software module. In some embodiments, the gain of test signal amplifier 130 is controlled by test signal gain control unit 126. Test signal gain control unit 126 determines, based on the gain of RF-PGA 116, the amplitude of the live GNSS signal, and thus adjusts the gain of test signal amplifier 130 so that the amplitude of the test signal is less than that of the live GNSS signal. The test signal amplitude is thus controlled to minimize interference with live GNSS signals. For example, the lower amplitude of the test signal, together with a larger bandwidth than that of the live GNSS signal, would result in a lower power spectral density compared to that of any received live GNSS signal. In some embodiments, device 100 includes at least a first amplifier (e.g., RF PGA 116) for amplifying the live GNSS signal and/or the test signal, and a second amplifier (e.g., test signal amplifier 130) for amplifying the test signal.

In step 608, the amplified test signal is injected into the GNSS device at an input node. By way of example, as depicted in FIG. 1, the test signal is "injected" into the signal chain of device 100 at signal adder 112. Injection as used herein refers to coupling of a signal, such as the test signal, to a component of device 100. For example, when the live GNSS signal is present, signal adder 112 combines the live GNSS signal and the test signal to create a mixed signal. In some embodiments, signal adder 112 and thus the input node is placed in a down-conversion stage. For example, as depicted in FIG. 1, the down-conversion of the live GNSS signal occurs at mixer 110, and signal adder 112 is located after mixer 110 in the signal chain. In some alternative embodiments not illustrated, signal adder 112 may be located prior to mixer 110 in the signal chain, so that the injection of the test signal occurs prior to down-conversion. In some embodiment, the test signal may be added to the live GNSS signal continuously. Alternatively, the test signal may be added to the live GNSS signal in a predetermined time period/interval.

In step 610, device 100 processes the test signal. After injection in step 608, the test signal is processed by device 100 together with the live GNSS signal, and an auto-correlation of the test signal is produced by correlate-and-dump unit 134. In some embodiments, device 100 processes the test signal in a similar manner as the live GNSS signal. In some embodiments, device 100 may process the test signal differently. For example, when processing the live GNSS signal, device 100 may first perform an acquisition step to bring the live GNSS signal into a tracking loop with the local replica signal. However, device 100 may skip the acquisition step with the test signal, and the tacking loop may be established immediately since the test signal's characteristics (e.g., frequency, phase, etc.) are always known to device 100.

Referring back to FIG. 2, each of early signal 401, prompt signal 402, and late signal 403 produced by correlate-and-dump unit 134 may include a test signal component and a live GNSS signal component. The test signal components of early signal 401, prompt signal 402, and/or late signal 403 are provided to a plurality of diagnostic modules, including carrier phase error detector 201, group delay drift detector 203, carrier tracking error detector 205, signal amplitude error detector 207, and receiver BW error detector 209. In some embodiments, the test signal components of early signal 401, prompt signal 402, and/or late signal 403 are processed by one or more integrators, such as first integrator 202 and second integrator 204. In some embodiments, the test signal components of early signal 401, prompt signal 402, and/or late signal 403 produced by correlate-and-dump unit 134 may be retrieved from memory 138.

In steps 612a-e, device 100 monitors the processed test signal. Device 100 may carry out steps 612a-e concurrently. As previously described with respect to FIG. 2, nominal values of auto-correlation of the test signal after processing by device 100 may be known from prior testing. Thus, the output of correlate-and-dump unit 134 for the test signal is monitored and compared to these nominal values stored in the memory 138 of device 100, e.g. memory 138. When the outputs of correlate-and-dump unit 134 do not match these nominal values, some device failure may be assumed. Different parameters of the test signal may be monitored by the plurality of diagnostic modules including carrier phase error detector 201, group drift error detector 203, carrier tracking error detector 205, signal amplitude error detector 207, and receiver BW error detector 209.

In step 612a, carrier phase is monitored. By way of example depicted in FIG. 2, carrier phase error detector 201 includes carrier phase discriminator 206 coupled to receive prompt signal 402. Carrier phase discriminator 206 obtains the carrier phase of the test signal after processing by device 100, and comparator 208 compares this result with the nominal value of carrier phase. Differences between the obtained carrier phase and the nominal carrier phase that exceed a threshold value may indicate an aberration. In some embodiments, an aberration in the carrier phase of the test signal indicates a "Yes" in step 614. In the example of FIG. 2, aberration in the carrier phase may indicate a drift in a fast group delay, or a clock error.

In step 612b, lock status is monitored. By way of example depicted in FIG. 2, carrier tracking error detector 205 includes DLL 216 coupled to receive early signal 401, prompt signal 402, and late signal 403. DLL 216 determines whether the tracking loop of the test signal is maintained. In some embodiments, there is a predefined relationship between the magnitudes of the test signal components of early signal 401, prompt signal 402, and late signal 403. For example, in a locked tracking loop, the magnitude of the test signal component of early signal 401 should be similar to the magnitude of the test signal component of late signal 403, and both magnitudes should be much less than the magnitude of the test signal components of prompt signal 402. The tracking loop may be lost if DLL 216 determines the predefined relationship is not satisfied. Under normal operating condition, the tracking loop of the test signal should always be locked (i.e., always tracked). Loss of the lock may be an aberration indicating an unspecified error in device 100 or test signal generator 128. In some embodiments, an aberration in the lock status of the test signal tracking loop indicates a "Yes" in step 614.

In step 612c, group delay drift is monitored. By way of example depicted in FIG. 2, group delay drift detector 203 includes drift calculator 212 coupled to receive early signal 401 and late signal 403. Drift calculator 212 determines a drift value based on equation (1) discussed above. Comparator and error counter 214 compares this calculated drift value with a nominal drift value calculated using nominal values of early signal 401 and late signal 403. Comparator and error counter 214 may also accumulate the differences between the calculated drift value and the nominal drift. In some embodiments, when the accumulated differences exceed a threshold value, group delay drift detector 203 indicates an aberration in group delay of the test signal tracking loop, and indicates "Yes" in step 614.

In step 612d, magnitude of the auto-correlated test signal is monitored. By way of example depicted in FIG. 2, signal amplitude error detector 207 includes comparator and error counter 220 coupled to receive prompt signal 402. Comparator and error counter 220 compares the magnitude of the test signal components of prompt signal 402 with a nominal magnitude. Comparator and error counter 220 may also accumulate the differences between the obtained magnitude value and the nominal magnitude. In some embodiments, when the accumulated differences exceed a threshold value, signal amplitude error detector 207 indicates an aberration in the magnitude of the auto-correlated test signal and may indicate a "Yes" in step 614.

In step 612e, bandwidth of the test signal is monitored. By way of example depicted in FIG. 2, receiver BW error detector 209 includes ratio calculator 222 coupled to receive the test signal components of early signal 401, prompt signal 402, and late signal 403. Ratio calculator 222 determines a ratio value given by equation (2). Comparator and error counter 224 compares the calculated ratio value with a nominal ratio value calculated using nominal values of early signal 401, prompt signal 402, and late signal 403. Comparator and error counter 224 may also accumulate the differences between the calculated ratio value and the nominal drift value. In some embodiments, when the accumulated differences exceed a threshold value, receiver BW error detector 209 may indicate an aberration in the bandwidth of the test signal, and indicates a "Yes" in step 614.

In step 614, if the determination is "Yes," process 600 proceeds to step 616, which indicates a possible failure in device 100 corresponding to the particular diagnostic module or modules that indicated aberrations. If step 614 is "No", process 600 returns to step 610, and device 100 continues to process the test signal.

In step 616, device 100 provides notification of errors. The notifications correspond to the aberration determined by the one or more diagnostic module or modules. By way of example in FIG. 3, step 616 provides a notification of a device failure relating to fast group delay drift and/or clock, a loss of lock status for test signal tracking loop, slow group delay drift, amplifier or I/O stage failure, and/or the bandwidth based on determination of steps 612a-e. In some embodiments, step 616 may also cause device 100 to enter a safe-mode. A safe-mode is a condition to which an electronic device defaults in the case that reliable operation cannot be ensured. For example, in a safe mode, device 100 may cease operation to avoid causing errors in output. Alternatively, device 100 may continue operation in the safe mode to maintain availability as demanded by different applications. For example, in case of device operation in an adverse environment prone to false alarms, device shutdown may be undesirable or unnecessary.

The memory of the present disclosure may be a tangible device that can store instructions for use by an instruction execution device, such as a processor described above. The memory may be, for example, but is not limited to, an electronic storage device, a magnetic storage device, an optical storage device, an electromagnetic storage device, a semiconductor storage device, or any suitable combination of the foregoing. A non-exhaustive list of more specific examples of memory includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions of the present disclosure, such as any software modules or algorithms executable by a processor, may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide-area network (WAN).

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments," "another embodiment" or "alternative embodiment" in various places in the present disclosure do not all necessarily refer to the same embodiment, nor are separate or alternative embodiments necessarily mutually exclusive of other embodiments.

It should be understood that the steps of the example methods set forth herein are not necessarily required to be performed in the order described, and the order of the steps of such methods should be understood to be merely an example. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

As used in the present disclosure, the word "exemplary" is used herein to mean serving as an example, instance, or illustration. Any aspect or design described herein as "exemplary" is not necessarily to be construed as preferred or advantageous over other aspects or designs. Rather, use of the word is intended to present concepts in a concrete fashion.

As used in the present disclosure, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives and variations in the details, materials, and arrangements of the parts which have been described and illustrated in order to explain the nature of described embodiments may be made by those skilled in the art without departing from the scope. Accordingly, the following claims embrace all such alternatives, modifications and variations that fall within the terms of the claims.

What is claimed is:

1. A method for diagnosing a failure of a device, comprising steps of:
    receiving, by a receiving section of the device, a live signal, the live signal being a GNSS signal;
    generating a test signal, the test signal including characteristics of the GNSS signal;
    amplifying, by a first amplifier, an amplitude of the GNSS signal;
    amplifying, by a second amplifier, an amplitude of the test signal based on the amplitude of the GNSS signal;
    injecting, after amplifying, the test signal into the device at an input node;
    processing, by a signal chain of the device, the test signal;
    processing, by the signal chain of the device, the GNSS signal;
    monitoring the test signal by:
        obtaining one or more output signals of the device at one or more output nodes, wherein the one or more output signals contain the GNSS signal and the test signal;
        recovering the test signal from the one or more output signals; and
        determining whether one or more errors in the test signal are present based on parameters of the recovered test signal;
    identifying a device failure based on the determined one or more errors; and
    generating an indication relating to the device failure.

2. The method of claim 1, wherein the test signal is one of a CDMA signal or an OFDM signal.

3. The method of claim 1, wherein the test signal is one of:
    a plurality of single band signals; or
    a wide band signal spanning a plurality of signal bands.

4. The method of claim 1, wherein injecting the test signal includes injecting the test signal continuously.

5. The method of claim 1, wherein injecting the test signal includes injecting the test signal at predetermined testing intervals.

6. The method of claim 1, wherein the one or more determined errors comprise an aberration in at least one of carrier lock status, code lock status, group delay drift, signal bandwidth, or amplitude.

7. The method of claim 1, wherein the parameters of the recovered test signal comprise at least one of phase, timing, amplitude, or information contained therein.

8. The method of claim 1, wherein the GNSS signal and the test signal differ in at least one of PRN codes, bandwidth, amplitude, or center frequency.

9. A method for diagnosing a failure of a device, comprising steps of:
    generating a test signal, the test signal including characteristics of a GNSS signal;
    amplifying the test signal;
    injecting, after amplifying, the test signal into the device at an input node;
    processing, by a signal chain of the device, the test signal;
    monitoring the test signal by:
        obtaining one or more output signals of the device at one or more output nodes;
        recovering the test signal from the one or more output signals; and
        determining whether one or more errors in the test signal are present based on parameters of the recovered test signal;
    identifying a device failure based on the determined one or more errors; and generating an indication relating to the device failure, wherein the input node is positioned after a down conversion stage in the signal chain.

10. A GNSS receiver having test signal based failure detection, comprising:

an RF front end system configured to receive a GNSS signal;

a signal generator configured to generate a test signal, the test signal having characteristics of the GNSS signal;

one of more amplifiers configured to amplify the test signal, the one or more amplifiers being RF programmable gain amplifiers and comprising:

a first amplifier configured to amplify an amplitude of the received GNSS signal; and a second amplifier configured to amplify an amplitude of the test signal based on the amplitude of the received GNSS signal;

a signal chain configured to receive the amplified test signal at an input node of the signal chain and process the received test signal and the received GNSS signal; and a processor configured to:

monitor the test signal by:

obtaining one or more output signals of the device at one or more output nodes, the one or more output signals containing the received GNSS signal and the test signal;

recovering the test signal from the one or more output signals; and determining whether one or more errors occurred based on parameters of the recovered test signal based on parameters of the recovered test signal;

identify a device failure based on the determined one or more errors; and generate notifications relating to the device failure.

11. The receiver of claim 10, wherein the test signal is one of a CDMA signal or an OFDM signal.

12. The receiver of claim 10, wherein the test signal is one of:

a plurality of single band signals; or a wide band signal spanning a plurality of signal bands.

13. The receiver of claim 10, wherein the signal chain is configured to receive the test signal continuously.

14. The receiver of claim 10, wherein the signal chain is configured to receive the test signal at predetermined testing intervals.

15. The receiver of claim 10, wherein the determined one or more errors comprise an aberration in at least one of carrier lock status, code lock status, group delay drift, signal bandwidth, or amplitude.

16. The receiver of claim 10, wherein the parameters of the test signal comprise at least one of phase, timing, amplitude, or information contained therein.

17. The receiver of claim 10, wherein the GNSS signal and the test signal differ in at least one of PRN codes, bandwidth, amplitude, or center frequency.

18. A GNSS receiver having test signal based failure detection, comprising:

a signal generator configured to generate a test signal, the test signal having characteristics of a GNSS signal;

one of more amplifiers configured to amplify the test signal;

a signal chain configured to receive the amplified test signal at an input node of the signal chain and process the received test signal; and a processor configured to:

monitor the test signal by:

obtaining one or more output signals of the device at one or more output nodes;

recovering the test signal from the one or more output signals; and determining whether one or more errors occurred based on parameters of the recovered test signal based on parameters of the recovered test signal;

identify a device failure based on the determined one or more errors; and generate notifications relating to the device failure, wherein the input node is positioned after a down conversion stage in the signal chain.

* * * * *

UNITED STATES PATENT AND TRADEMARK OFFICE
CERTIFICATE OF CORRECTION

PATENT NO. : 11,536,852 B2
APPLICATION NO. : 17/130476
DATED : December 27, 2022
INVENTOR(S) : Zhenlan Cheng et al.

Page 1 of 1

It is certified that error appears in the above-identified patent and that said Letters Patent is hereby corrected as shown below:

On the Title Page

Item (57), Lines 11-13 of the ABSTRACT, "determining whether one or more errors occurred based on parameters of the recovered test signal based on parameters of the recovered test signal;" should read --determining whether one or more errors occurred based on parameters of the recovered test signal;--.

In the Claims

Claim 10, Column 15, Lines 33-35, "determining whether one or more errors occurred based on parameters of the recovered test signal based on parameters of the recovered test signal;" should read --determining whether one or more errors occurred based on parameters of the recovered test signal;--.

Claim 18, Column 16, Lines 33-35, "determining whether one or more errors occurred based on parameters of the recovered test signal based on parameters of the recovered test signal;" should read --determining whether one or more errors occurred based on parameters of the recovered test signal;--.

Signed and Sealed this
Twenty-sixth Day of September, 2023

Katherine Kelly Vidal
*Director of the United States Patent and Trademark Office*